(12) United States Patent
Moore et al.

(10) Patent No.: US 7,268,197 B2
(45) Date of Patent: Sep. 11, 2007

(54) WATER- AND OIL-REPELLENT FLUOROURETHANES AND FLUOROUREAS

(75) Inventors: George G. I. Moore, Afton, MN (US); Ramesh C. Kumar, Maplewood, MN (US); Zai-Ming Qiu, Woodbury, MN (US); John C. Clark, White Bear Lake, MN (US); Chetan P. Jariwala, Woodbury, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/275,114

(22) Filed: Dec. 12, 2005

(65) Prior Publication Data

US 2006/0142474 A1   Jun. 29, 2006

Related U.S. Application Data

(63) Continuation-in-part of application No. 11/027,633, filed on Dec. 28, 2004.

(51) Int. Cl.
    *C08F 12/20*   (2006.01)
(52) U.S. Cl. .................. 526/242; 526/286; 526/319; 528/70; 524/544; 560/167
(58) Field of Classification Search ............... 526/242, 526/286, 319; 528/70; 524/544; 560/167
    See application file for complete search history.

(56) References Cited

U.S. PATENT DOCUMENTS

| | | | |
|---|---|---|---|
| 2,803,615 A | 8/1957 | Ahlbrecht et al. |
| 3,011,988 A | 12/1961 | Luedke et al. |
| 3,278,352 A | 10/1966 | Erickson |
| 3,282,905 A | 11/1966 | Fasick et al. |
| 3,318,852 A | 5/1967 | Dixon |
| 3,378,609 A | 4/1968 | Fasick et al. |
| 3,398,182 A | 8/1968 | Guenthner et al. |
| 3,413,226 A | 11/1968 | Coleman |
| 3,455,889 A | 7/1969 | Coleman |
| 3,458,391 A | 7/1969 | Miller, Jr. |
| 3,459,834 A | 8/1969 | Schmitt |
| 3,787,351 A | 1/1974 | Olson |
| 4,321,404 A | 3/1982 | Williams et al. |
| 4,366,300 A | 12/1982 | Delescluse |
| 4,513,059 A | 4/1985 | Dabroski |
| 4,778,915 A | 10/1988 | Lina et al. |
| 4,792,444 A | 12/1988 | Fukasawa et al. |
| 4,920,190 A | 4/1990 | Lina et al. |
| 5,032,460 A | 7/1991 | Kantner et al. |
| 5,093,398 A | 3/1992 | Rottger et al. |
| 5,115,059 A | 5/1992 | Le |
| 5,144,056 A | 9/1992 | Lina et al. |
| 5,173,547 A | 12/1992 | Rottger et al. |
| 5,446,118 A | 8/1995 | Shen et al. |
| 5,646,222 A | 7/1997 | Maekawa et al. |
| 5,688,884 A | 11/1997 | Baker et al. |
| 5,723,630 A | 3/1998 | Cheburkov et al. |
| 5,725,789 A | 3/1998 | Huber et al. |
| 5,872,180 A | 2/1999 | Michels et al. |
| 5,883,175 A | 3/1999 | Kubo et al. |
| 6,001,923 A | 12/1999 | Moncur et al. |
| 6,048,952 A | 4/2000 | Behr et al. |
| 6,114,045 A | 9/2000 | Juhue et al. |
| 6,121,143 A | 9/2000 | Messner et al. |
| 6,197,378 B1 | 3/2001 | Clark et al. |
| 6,238,798 B1 | 5/2001 | Kang et al. |
| 6,265,060 B1 | 7/2001 | Arudi et al. |
| 6,482,911 B1 | 11/2002 | Jariwala et al. |
| 6,500,439 B1 | 12/2002 | Morita et al. |
| 6,569,521 B1 | 5/2003 | Sheridan et al. |
| 6,664,354 B2 | 12/2003 | Savu et al. |

(Continued)

FOREIGN PATENT DOCUMENTS

EP   0 712 046 A1   5/1996

(Continued)

OTHER PUBLICATIONS

G. Oertel, Polyurethane Handbook, (1993), 2nd Edition, Hanser/Gardner Publications, Inc., Cincinnati, OH.

(Continued)

*Primary Examiner*—David W. Wu
*Assistant Examiner*—M. Bernshteyn
(74) *Attorney, Agent, or Firm*—Lisa P. Fulton

(57) ABSTRACT

A fluorochemical compound comprises the reaction product of:
(a) the reaction product of:
  (i) at least one fluorochemical alcohol represented by the formula:

$C_nF_{2n+1}—X—OH$ wherein:
  n=1 to 6,

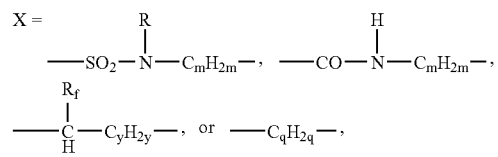

R=hydrogen or an alkyl group of 1 to 4 carbon atoms,
  m=2 to 8,
  $R_f=C_nF_{2n+1}$,
  y=0 to 6,
  q=1 to 8; and
  (ii) at least one unbranched symmetric diisocyanate, and
(b) at least one co-reactant comprising two or more functional groups that are capable of reacting with an isocyanate group.

27 Claims, No Drawings

U.S. PATENT DOCUMENTS

| | | |
|---|---|---|
| 6,750,277 B1 | 6/2004 | Yamana et al. |
| 6,803,109 B2 | 10/2004 | Qiu et al. |
| 6,890,360 B2 | 5/2005 | Cote et al. |
| 6,894,106 B2 | 5/2005 | Aga et al. |
| 6,939,580 B2 | 9/2005 | Enomoto et al. |
| 2001/0005738 A1 | 6/2001 | Bruchmann et al. |
| 2003/0001130 A1 | 1/2003 | Qiu |
| 2003/0026997 A1 | 2/2003 | Qiu et al. |
| 2003/0083448 A1 | 5/2003 | Fan et al. |
| 2003/0130457 A1 | 7/2003 | Maekawa et al. |
| 2004/0147188 A1* | 7/2004 | Johnson et al. ............... 442/93 |
| 2005/0106326 A1 | 5/2005 | Audenaert et al. |
| 2005/0137289 A1 | 6/2005 | Hooftman et al. |
| 2005/0143541 A1 | 6/2005 | Caldwell et al. |
| 2005/0143595 A1 | 6/2005 | Klun et al. |

FOREIGN PATENT DOCUMENTS

| | | |
|---|---|---|
| EP | 0 849 392 A2 | 6/1998 |
| EP | 1 225 187 A1 | 7/2002 |
| EP | 1 225 188 A1 | 7/2002 |
| EP | 1 329 548 A1 | 7/2003 |
| EP | 1 380 628 A1 | 1/2004 |
| FR | 1.468.301 | 12/1966 |
| GB | 870022 | 6/1961 |
| GB | 1 120 304 | 7/1968 |
| JP | 61-148208 | 7/1986 |
| WO | WO97/14842 A1 | 4/1997 |
| WO | WO 01/30873 A1 | 5/2001 |
| WO | WO 03/048224 A1 | 6/2003 |
| WO | WO 03/062521 A1 | 7/2003 |
| WO | WO 2005/065164 A2 | 7/2005 |
| WO | WO 2005/066224 A1 | 7/2005 |

OTHER PUBLICATIONS

U.S. Appl. No. 11/027,605, filed Dec. 28, 2004, entitled "Fluoroacrylate-Mercaptofunctional Copolymers".

U.S. Appl. No. 11/027,612, filed Dec. 28, 2004, entitled "Fluoroacrylate-Multifunctional Acrylate Copolymer Compositions".

U.S. Appl. No. 11/027,606, filed Dec. 28, 2004, entitled "Water-Based Release Coating Containing Fluorochemical".

U.S. Appl. No. 11/027,602, filed Dec. 28, 2004, entitled "Fluorochemical Containing Low Adhesion Backsize".

* cited by examiner

WATER- AND OIL-REPELLENT FLUOROURETHANES AND FLUOROUREAS

CROSS REFERENCE TO RELATED APPLICATIONS

This application is a continuation-in-part of U.S. application Ser. No. 11/027,633, filed Dec. 28, 2004, now pending.

FIELD

This invention relates to water- and oil-repellent fluorochemicals such as fluorourethanes and fluoroureas, and to methods for making the fluorochemicals.

BACKGROUND

Various fluorinated resins containing urethane linkages are known to have oil and water repellency properties (see, for example, U.S. Pat. No. 4,321,404 (Williams et al.), U.S. Pat. No. 4,778,915 (Lina et al.), U.S. Pat. No. 4,920,190 (Lina et al.), U.S. Pat. No. 5,144,056 (Anton et al.), and U.S. Pat. No. 5,446,118 (Shen et al.)). These resins can be polymerized and applied as coatings to substrates such as, for example, textiles, carpets, wall coverings, leather, and the like to impart water- and oil repellency.

Typically, these resins comprise long chain pendant perfluorinated groups (for example, 8 carbon atoms or greater) because long chains readily align parallel to adjacent pendant groups attached to acrylic backbone units, and thus maximize water- and oil-repellency. However, long chain perfluorinated group-containing compounds such as, for example, perfluorooctyl containing compounds may bioaccumulate in living organisms (see, for example, U.S. Pat. No. 5,688,884 (Baker et al.)).

SUMMARY

In view of the foregoing, we recognize that there is a need for water- and oil-repellent compounds that are less bioaccumulative.

Briefly, in one aspect, the present invention provides water- and oil-repellent fluorochemical compounds such as fluorourethanes and fluoroureas that have short chain perfluorinated groups (6 carbon atoms or less), which are believed to be less toxic and less bioaccumulative than longer chain perfluorinated groups (see, for example, WO 01/30873). The fluorochemical compounds of the invention comprise the reaction of (a) the reaction product of:

(i) at least one fluorochemical alcohol represented by the formula:

$$C_nF_{2n+1}-X-OH$$

wherein:
n=1 to 6,

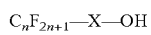

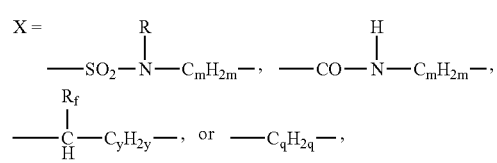

R=hydrogen or an alkyl group of 1 to 4 carbon atoms,
m=2 to 8,
$R_f=C_nF_{2n+1}$,
y=0 to 6,
q=1 to 8; and (ii) at least one unbranched symmetric diisocyanate, and
(b) at least one co-reactant comprising two or more functional groups that are capable of reacting with an isocyanate group.

The invention also provides fluorochemical compounds comprising the reaction product of:

(a) at least one fluorinated isocyanate represented by the following general formula:

$$C_nF_{2n+1}-X-OC(O)NH-A-NCO$$

wherein:
n=1 to 6,

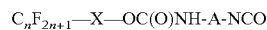

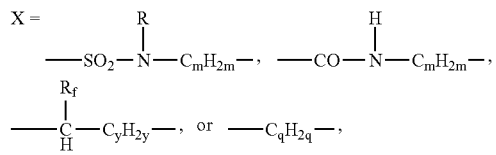

R=H or an alkyl group of 1 to 4 carbon atoms,
m=2 to 8,
$R_f=C_nF_{2n+1}$,
y=0 to 6,
q=1 to 8, and
A=an unbranched symmetric alkylene group, arylene group, or aralkylene group; and (b) at least one co-reactant comprising two or more functional groups that are capable of reacting with an isocyanate group.

It has been discovered that the fluorochemical compounds of the invention exhibit good water- and oil-repellency properties. In light of the prior art, one would expect that fluorochemical compounds derived from shorter perfluorinated chains would not be as effective at imparting water- and oil-repellency as those derived from longer perfluorinated chains (see, for example, U.S. Pat. No. 2,803,615 (Ahlbrecht et al.) and U.S. Pat. No. 3,787,351 (Olson)). Surprisingly, however, the fluorochemical compounds of the invention exhibit water- and oil-repellency comparable to fluorochemical compounds with longer perfluorinated chains.

The fluorochemical compounds of the invention therefore meet the need in the art for water- and oil-repellent compounds that are less bioaccumulative.

In other aspects, this invention also provides coating compositions and release coating compositions comprising the fluorochemical compounds, and articles coated with the coating or release coating compositions.

DETAILED DESCRIPTION

Fluorinated isocyanates useful in the invention are the reaction product of at least one fluorochemical alcohol and at least one unbranched symmetric diisocyanate.

Useful fluorochemical alcohols can be represented by the formula:

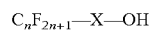

wherein:
n=1 to 6,

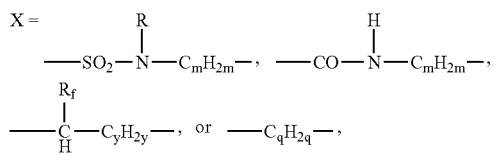

R=hydrogen or an alkyl group of 1 to 4 carbon atoms,
m=2 to 8,
$R_f=C_nF_{2n+1}$,
y=0 to 6, and
q=1 to 8.

Representative examples of suitable alcohols include $CF_3CH_2OH$, $(CF_3)_2CHOH$, $(CF_3)_2CFCH_2OH$, $C_2F_5SO_2NH(CH_2)_2OH$, $C_2F_5SO_2NCH_3(CH_2)_2OH$, $C_2F_5SO_2NCH_3(CH_2)_4OH$, $C_2F_5SO_2NC_2H_5(CH_2)_6OH$, $C_2F_5(CH_2)_4OH$, $C_2F_5CONH(CH_2)_4OH$, $C_3F_7SO_2NCH_3(CH_2)_3OH$, $C_3F_7SO_2NH(CH_2)_2OH$, $C_3F_7CH_2OH$, $C_3F_7CONH(CH_2)_8OH$, $C_4F_9(CH_2)_2OH$, $C_4F_9SO_2NCH_3(CH_2)_2OH$, $C_4F_9CONH(CH_2)_2OH$, $C_4F_9SO_2NCH_3(CH_2)_4OH$, $C_4F_9SO_2NH(CH_2)_7OH$, $C_4F_9SO_2NC_3H_7(CH_2)_2OH$, $C_4F_9SO_2NC_4H_9(CH_2)_2OH$, $C_5F_{11}SO_2NCH_3(CH_2)_2OH$, $C_5F_{11}CONH(CH_2)_2OH$, $C_5F_{11}(CH_2)_4OH$, $C_6F_{13}COHN(CH_2)_4OH$, $C_6F_{13}SO_2NCH_3(CH_2)_2OH$, $C_6F_{13}(CH_2)_2OH$, and the like.

Preferably, n is 1 to 5; more preferably, n is 1 to 4; most preferably, n is 4. Preferably, m is 2 to 4. Preferably, q is 2.

Preferably, X is

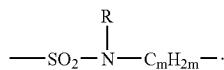

More preferably, X is

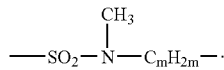

Most preferably, X is selected from the group consisting of

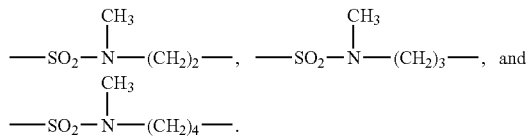

Preferred fluorochemical alcohols include, for example, $C_4F_9SO_2NCH_3(CH_2)_2OH$, $C_4F_9SO_2NCH_3(CH_2)_4OH$, and $C_4F_9(CH_2)_2OH$. A more preferred fluorochemical alcohol is $C_4F_9SO_2NCH_3(CH_2)_2OH$.

The above-described fluorochemical alcohols can be reacted with an unbranched symmetric diisocyanate to form a fluorinated isocyanate. Symmetric diisocyanates are diisocyanates that meet the three elements of symmetry as defined by *Hawley's Condensed Chemical Dictionary* 1067 (1997). First, they have a center of symmetry, around which the constituent atoms are located in an ordered arrangement. There is only one such center in the molecule, which may or may not be an atom. Second, they have a plane of symmetry, which divides the molecule into mirror-image segments. Third, they have axes of symmetry, which can be represented by lines passing through the center of symmetry. If the molecule is rotated, it will have the same position in space more than once in a complete 360° turn.

As used herein, the term "unbranched" means that the symmetric diisocyanate does not contain any subordinate chains of one or more carbon atoms.

Representative examples of unbranched symmetric diisocyanates include 4,4'-diphenylmethane diisocyanate (MDI), 1,6-hexamethylene diisocyanate (HDI), 1,4-phenylene diisocyanate (PDI), 1,4-butane diisocyanate (BDI), 1,8-octane diisocyanate (ODI), 1,12-dodecane diisocyanate, and 1,4-xylylene diisocyanate (XDI).

Preferred unbranched symmetric diisocyanates include, for example, MDI, HDI, and PDI. A more preferred unbranched symmetric diisocyanate is MDI. In its pure form, MDI is commercially available as Isonate™ 125M from Dow Chemical Company (Midland, Mich.), and as Mondur™ from Bayer Polymers (Pittsburgh, Pa.).

The fluorinated isocyanates useful in the invention can be prepared, for example, by combining the fluorochemical alcohol and unbranched symmetric diisocyanate in a solvent. Useful solvents include esters (for example, ethyl acetate), ketones (for example, methyl ethyl ketone), ethers (for example, methyl-tert-butyl ether), alkanes (for example, hexane or heptane), and aromatic solvents (for example, toluene).

Preferably, the reaction mixture is agitated. The reaction can generally be carried out at a temperature between room temperature and about 120° C. (preferably, between about 50° C. and about 70° C.).

Typically the reaction is carried out in the presence of a catalyst. Useful catalysts include bases (for example, tertiary amines, alkoxides, and carboxylates), metal salts and chelates, organometallic compounds, acids and urethanes. Preferably, the catalyst is an organotin compound (for example, dibutyltin dilaurate (DBTDL) or a tertiary amine (for example, diazobicyclo[2.2.2]octane (DABCO)), or a combination thereof. More preferably, the catalyst is DBTDL.

Useful fluorinated isocyanates can be represented by the following general formula:

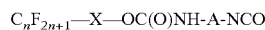

wherein:
n=1 to 6,

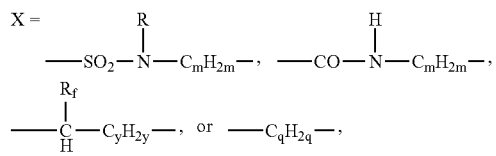

R=H or an alkyl group of 1 to 4 carbon atoms,
m=2 to 8,
$R_f=C_nF_{2n+1}$,
y=0 to 6,
q=1 to 8, and
A=an unbranched symmetric alkylene group, arylene group, or aralkylene group Preferably, n is 1 to 5; more preferably, n is 1 to 4; most preferably, n is 4. Preferably, q is 2.

Preferably, X is

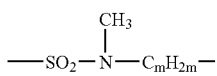

and m is 2 to 4.

Preferably, A is selected from the group consisting of $C_6H_{12}$,

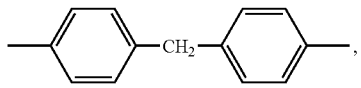

and

more preferably, A is

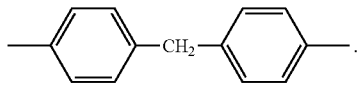

The above-described fluorinated isocyanates can be reacted with a co-reactant comprising two or more functional groups that are capable of reacting with an isocyanate group to form a water- and oil-repellent fluorochemical compound of the invention. Groups capable of reacting with an isocyanate reactive group include, for example, -Z-H groups, wherein each Z is independently selected from the group consisting of O, N, and S. Preferably, Z is O or N.

Suitable co-reactants include, for example, polyols, polyamines, and polythiols. As used herein, the prefix "poly" means two or more. For example, the term "polyols" includes diols, triols, tetraols, etc.

Polyols include, for example, acrylate polymers and copolymers from hydroxyl-containing (meth)acrylate monomers; diols such as polyether diols, polyester diols, dimer diols, fatty acid ester diols, polysiloxane dicarbinols, and alkane diols; alkane tetraols; polyvinyl alcohols; polyepoxides; polystyrene; polyesters; polyurethanes; and the like.

Examples of useful acrylate copolymers include copolymers of hydroxyl-containing (meth)acrylates such as hydroxyethyl acrylate with monomers such as butyl acrylate, isooctyl acrylate, or octadecyl acrylate; poly co{hydroxyethyl acrylate/$CH_2$=$CCH_3CO_2C_3H_6(Si(CH_3)_2O)_nSi(CH_3)_2C_4H_9$}; poly co{hydroxyethyl acrylate/mercaptopropylmethylsiloxane-co-dimethylsiloxane}; and poly(2-hydroxyethyl methacrylate); and the like.

Examples of fatty ester diols include glycerol mono-oleate, glycerol mono-stearate, glycerol mono-ricinoleate, glycerol mono-tallow, long chain alkyl di-esters of pentaerythritol, and the like.

Examples of polyester polyols include polycaprolactone diol and hyperbranched polyester polyols available from Perstorp Polyols, Inc. (Toledo, Ohio).

Polysiloxane dicarbinols include polydialkylsiloxane dicarbinols and polyalkylarylsiloxane dicarbinols. Useful polysiloxane dicarbinols include, for example, those that correspond to one of the following formulas:

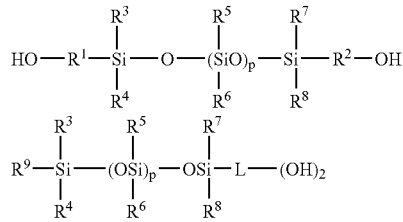

wherein $R^1$ and $R^2$ independently represent an alkylene having 1 to 4 carbon atoms, $R^3$, $R^4$, $R^5$, $R^6$, $R^7$, $R^8$ and $R^9$ independently represent an alkyl group having 1 to 4 carbon atoms or an aryl group, L represents a trivalent linking group and p represents a value of 10 to 50. L is for example a linear or branched alkylene that may contain one or more catenary hetero atoms such as oxygen or nitrogen.

Examples of polyvinyl alcohols include poly(vinyl alcohol), poly(vinyl acetate-co-vinyl alcohol), poly(vinyl alcohol-co-ethylene), and the like.

Examples of polyepoxides include polyglycidol (linear or hyperbranched) and the like.

Examples of polystyrenes include poly(4-vinylphenol), poly(4-vinylphenol-co-2-hydroxyethyl methacrylate, and the like.

Useful polyamines include, for example, polyamines having at least two amino groups, wherein the two amino groups are primary, secondary, or a combination thereof. Examples include $H_2N(CH_2CH_2NH)_2H$, $H_2N(CH_2CH_2NH)_3H$, $H_2N(CH_2CH_2NH)_4H$, $H_2N(CH_2CH_2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2NH)_2H$, $H_2N(CH_2)_3NHCH_2CH$=$CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, 1,10-diaminodecane, 1,12-diaminododecane, 9,9-bis(3-aminopropyl)fluorene, bis (3-aminopropyl)phenylphosphine, 2-(4-aminophenyl)ethylamine, 1,4-butanediol bis(3-aminopropyl) ether, $N(CH_2CH_2NH_2)$ 3,1,8-diamino-p-menthane, 4,4'-diaminodicyclohexylmethane, 1,3-bis(3-aminopropyl)tetramethyldisiloxane, 1,8-diamino-3,6-dioxaoctane, 1,3-bis(aminomethyl)cyclohexane, 1,4-bis(3-aminopropyl)piperazine, and polymeric polyamines such as linear or branched (including dendrimers) homopolymers and copolymers of ethyleneimine (that is, aziridine), aminopropylmethylsiloxane-co-dimethylsiloxane, bis-aminopropyldimethylsiloxane, and the like.

Polythiols include the homopolymer of mercaptopropylmethylsiloxane and its copolymers with dimethylsiloxane (available from Gelest Inc.), 1,1,1-trimethylolpropane tris-(3-mercaptopropionate), pentaerythritol tetra(3-mercaptopropionate), trimethylolpropane tris(3-mercaptopropionate), tris[2-(3-mercaptopropionyloxy)ethyl] isocyanurate, and the like.

Examples of dithiols include 2,2'-oxydiethanethiol, 1,2-ethanethiol, 3,7-dithia-1,9-nonanedithiol, 1,4-butanedithiol, 1,6-hexanedithiol, 1,7-heptanedithiol, 1,8-octanedithiol, 1,9-nonanedithiol, 3,6-dioxa-1,8-octanedithiol, 1,10-decanedithiol, 1,12-dimercaptododecane, ethylene glycol bis (3-mercaptopropionate), 1,4-butanediol bis(3-mercaptopropionate), and the like.

The fluorochemical compounds of the invention can be prepared, for example, by combining the fluorinated isocyanate and the co-reactant comprising two or more functional groups that are capable of reacting with an isocyanate group in a solvent. Useful solvents include esters (for example, ethyl acetate), ketones (for example, methyl ethyl ketone), ethers (for example, methyl-tert-butyl ether), and aromatic solvents (for example, toluene).

Preferably, the reaction mixture is agitated. The reaction can generally be carried out at a temperature between room temperature and about 120° C. (preferably, between about 50° C. and about 70° C.).

Typically the reaction is carried out in the presence of a catalyst. Useful catalysts include bases (for example, tertiary amines, alkoxides, and carboxylates), metal salts and chelates, organometallic compounds, acids and urethanes. Preferably, the catalyst is an organotin compound (for example, dibutyltin dilaurate (DBTDL) or a tertiary amine (for example, diazobicyclo[2.2.2]octane (DABCO)), or a combination thereof. More preferably, the catalyst is DBTDL.

Typically, some unreacted functional groups will remain. Unreacted functional groups can be useful, for example, for improving adhesion or for crosslinking.

Fluorochemical compounds of the invention can be used in coating compositions to impart water- and oil-repellency to a wide variety of substrates. The coating compositions comprise a fluorochemical compound of the invention and a solvent (for example, water and/or an organic solvent). When the solvent is water, the coating composition typically further comprises a surfactant.

The fluorochemical compounds of the invention can be dissolved, suspended, or dispersed in a wide variety of solvents to form coating compositions suitable for coating onto a substrate. The coating compositions can generally contain from about 0.1 about 10 percent fluorochemical compound (preferably about 1 to about 5 percent), based on the weight of the coating composition.

The coating compositions can be applied to a wide variety of substrates such as, for example, fibrous substrates and hard substrates. Fibrous substrates include, for example, woven, knit, and non-woven fabrics, textiles, carpets, leather, and paper. Hard substrates include, for example, glass, ceramic, masonry, concrete, natural stone, man-made stone, grout, metals, wood, plastics, and painted surfaces.

The coating compositions can be applied to a substrate (or articles comprising a substrate) by standard methods such as, for example, spraying, padding, dipping, roll coating, brushing, or exhaustion. Optionally, the composition can be dried to remove any remaining water or solvent.

The fluorochemical compounds of the invention can be used for release coatings. The release coating compositions may or may not require a curing step after coating on a substrate.

Coating compositions useful for release coatings can be applied to surfaces requiring release properties from adhesives. Substrates suitable for release coatings include, for example, paper, metal sheets, foils, non-woven fabrics, and films of thermoplastic resins such as polyesters, polyamides, polyolefins, polycarbonates, and polyvinyl chloride.

Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other synthetic film-forming elastomeric adhesives.

EXAMPLES

Objects and advantages of this invention are further illustrated by the following examples, but the particular materials and amounts thereof recited in these examples, as well as other conditions and details, should not be construed to unduly limit this invention.

| GLOSSARY | | |
|---|---|---|
| Designator | Name, structure and/or formula | Availability |
| Boltron H50 | Boltron H50 polyester polyol | Perstorp, Sweden |
| BUTVAR B-79 | Water based polyvinyl butyral dispersion | Solutia Inc., St. Louis, MO |
| BUTVAR B-98 | Polyvinyl butyral | Solutia, Inc. |
| DBTDL | Dibutyltin dilaurate; $[CH_3(CH_2)_{10}CO_2]_2Sn[(CH_2)_3(CH_3)]_2$ | Sigma Aldrich Milwaukee, WI |
| DDT | Dodecanethiol; $CH_3(CH_2)_{11}SH$ | Sigma Aldrich |
| EtOAc | Ethyl acetate $CH_3CO_2CH_2CH_3$ | Sigma Aldrich |
| GA | Glutaric anhydride; 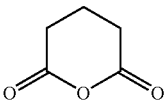 | Sigma Aldrich |
| HEA | 2-Hydroxyethyl acrylate; $HOCH_2CH_2OC(O)CH=CH_2$ | Sigma Aldrich |
| IOA | Isooctyl acrylate | 3M Company, St. Paul, MN |
| "KF-2001" | Random copolymer of mercaptopropylmethylsiloxane and dimethylsilicone (MW ~8,000; with ~4 equivalent —SH), (Cat.No: SMS-042) | Gelest Inc., Morrisville, PA |
| MEK | Methyl ethyl ketone $CH_3C(O)C_2H_5$ | Sigma Aldrich |
| MIBK | Methylisobutyl ketone; $CH_3C(O)CH(CH_3)(C_2H_5)$ | Sigma Aldrich |
| MeFBSE | $C_4F_9SO_2N(CH_3)C_2H_4OH$ | May be prepared as in U.S. Pat. No. 6,664,354 (Savu et. al) Example 2 |
| MDI | 4,4'-methylenebis(phenyl isocyanate); 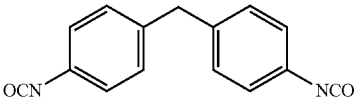 | Sigma Aldrich |
| NMP | N-methyl pyrrolidinone; 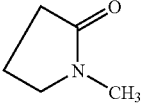 | Sigma Aldrich |

-continued

GLOSSARY

| Designator | Name, structure and/or formula | Availability |
|---|---|---|
| ODA | Octadecyl acrylate; $CH_3(CH_2)_{17}OC(O)CH=CH_2$ | Sigma Aldrich |
| ODI | Octadecyl isocyanate; $CH_3(CH_2)_{17}NCO$ | Sigma Aldrich |
| PEHA | Pentaethylenehexamine; $H_2N(CH_2CH_2NH)_4CH_2CH_2NH_2$ | Sigma Aldrich |
| PMPMS | Poly-(mercaptopropyl)methylsiloxane; $—(O—Si(CH_3)(C_3H_6SH))_n—$; MW 4,000-7,000 | Gelest Inc. |
| PVA-50 | Poly (vinyl alcohol); 50% hydrolyzed | Sigma Aldrich |
| PVA-98 | Poly (vinyl alcohol); 98% hydrolyzed | Sigma Aldrich |
| PVA-17K | "CELVOL" polyvinyl alcohol; 17,000 MW | Celanese, Dallas, TX |
| SD-890 | Silicone Diamine; GE Silicone 88849T; MW 890 | GE, Albany, NY |
| SM | Silicone Macromer; monomethacryloxypropyl terminated polydimethylsiloxane (MW ~10,000), Cat.No: MCR-M11. | Gelest Inc. |
| TPEG 730 | Trimethylolpropane ethoxylate; MW 730 | Sigma Aldrich |
| "VAZO-67" | $NCC(CH_3)(C_2H_5)N=NC(CH_3)(C_2H_5)CN$ | DuPont, Wilmington, DE |

Dynamic Contact Angle Measurement

A test solution, emulsion, or suspension (typically at about 3% solids) was applied to nylon 66 film (available from DuPont) by dip-coating strips of the film. Prior to coating, the film was cleaned with methyl alcohol. Using a small binder clip to hold one end of the nylon film, the strip was immersed in the test solution, and then withdrawn slowly and smoothly from the solution. The coated strip was allowed to air dry in a protected location for a minimum of 30 minutes and then was cured for 10 minutes at 150° C.

Advancing and receding contact angles on the coated film were measured using a CAHN Dynamic Contact Angle Analyzer, Model DCA 322 (a Wilhelmy balance apparatus equipped with a computer for control and data processing, commercially available from ATI, Madison, Wis.). Water and hexadecane were used as probe liquids. Values for both water and hexadecane are reported.

Preparation of $C_4F_9SO_2N(CH_3)CH_2CH_2OH$ (MeFBSE)

MeFBSE was prepared by essentially following the procedure described in U.S. Pat. No. 6,664,354 (Savu et al.), Example 2, Part A.

Preparation of $C_4F_9SO_2N(CH_3)C_2H_4OC(O)NHC_6H_4CH_2C_6H_4NCO$ (MeFBSE-MDI)

A one liter, three-necked round bottom flask, fitted with a heater, nitrogen inlet, reflux condenser and thermocouple was charged with MeFBSE (357.0 g; 1.0 mole) and MEK (600 mL) and heated to reflux, while distilling out 30 mL of MEK. The mixture was then cooled to 30° C. and treated with MDI (750 g; 3.0 mole). The temperature of the mixture was then increased to about 40° C. for 4 hours, filtered and added to toluene (4 l.). The resulting off white precipitate was collected by filtration, and re-crystallized from toluene (white solid; 689.4 g; 57% yield). Structure was confirmed using liquid chromatography/mass spectroscopy (LC/MS) and LC/UV analysis.

Reactant 1. Preparation of HEA/KF2001; 4/1 Equivalent Ratio

A 4 oz. bottle with a magnetic stirring bar was charged with HEA (2.49 g; 0.022 mole), "KF-2001" (10.77 g), MIBK (49.92 g) and "VAZO-67" (0.122 g). Nitrogen was bubbled through the solution for two minutes, and the bottle was sealed and placed in an oil bath at 70° C. for 24 hours. The resulting solution was 21.16% by wt solids, with a small amount of precipitation.

Example 1

Preparation of Reactant 1/MeFBSE-MDI; 1/4

A 4 oz. bottle with a magnetic stirring bar was charged with Reactant 1 (21.16% solution; 20.0 g), MeFBSE-MDI (4.14 g; 0.0068 mole), EtOAc (20.0 g) and DBTDL (3 drops). The bottle was sealed and placed in an oil bath at 70° C. and reacted for 8 hours with magnetic stirring. Analysis using FT-IR (Fourier transform infrared spectroscopy) indicated no —NCO remained. The resulting solution was 21.16% by wt solids, with a small amount of precipitation. The resulting solution was ~16% wt solids.

Example 2

Preparation of Reactant 1/MeFBSE-MDI; 1/2

The procedure described for Example 1 was essentially followed with the exception that 2.80 g of MeFBSE-MDI was used and the resulting solution was ~20% solids.

Example 3

Preparation of Reactant 1/MeFBSE-MDI; 1/3

The procedure described for Example 1 was essentially followed with the exception that 3.11 g of MeFBSE-MDI was used and the resulting solution was ~19% solids.

Reactant 2. Preparation of HEA/KF2001; 8/1 Equivalent Ratio

A 4 oz. bottle with a magnetic stirring bar was charged with HEA (4.64 g; 0.040 mole), "KF-2001" (10.03 g), MIBK (55.44 g) and "VAZO-67" (0.145 g). Nitrogen was bubbled through the solution for two minutes, and the bottle was sealed and placed in an oil bath at 70° C. for 24 hours. The resulting solution was 14.82% by wt solids, with a small amount of precipitation.

Example 4

Preparation of Reactant 2/MeFBSE-MDI; 1/8

A 4 oz. bottle with a magnetic stirring bar was charged with Reactant 2 (14.82% solution; 20.0 g), MeFBSE-MDI (6.948 g; 0.0114 mole), EtOAc (41.89 g) and DBTDL (3 drops). The bottle was sealed and placed in an oil bath at 70° C. and reacted for 8 hours with magnetic stirring. Analysis using FT-IR indicated no —NCO remained. The resulting solution was 15.6% by wt solids, with a small amount of precipitation. The resulting solution was ~16% wt solids.

Example 5

Preparation of Reactant 2/MeFBSE-MDI; 1/6

The procedure described for Example 4 was essentially followed with the exception that 5.21 g (0.0086 mole) of MeFBSE-MDI was used, 26.88 g of EtOAc was used and the resulting solution was ~16.8% solids.

Example 6

Preparation of Reactant 2/MeFBSE-MDI 1/4

The procedure described for Example 4 was essentially followed with the exception that 3.474 g (0.0057 mole) of MeFBSE-MDI was used, 32.12 g of EtOAc was used and the resulting solution was ~13.48% solids.

Reactant 3. Preparation of HEA/KF2001; 16/1 Equivalent Ratio

A 4 oz. bottle with a magnetic stirring bar was charged with HEA (9.31 g; 0.080 mole), "KF-2001" (10.01 g), MIBK (79.32 g) and "VAZO-67" (0.192 g). Nitrogen was bubbled through the solution for two minutes, and the bottle was sealed and placed in an oil bath at 70° C. for 24 hours. The resulting solution was 19.51% by wt solids, with a small amount of precipitation.

Example 7

Preparation of Reactant 3/MeFBSE-MDI; 1/16

A 4 oz. bottle with a magnetic stirring bar was charged with Reactant 3 (19.51% solution; 20.0 g), MeFBSE-MDI (9.76 g; 0.0165 mole), EtOAc (41.32 g) and DBTDL (3 drops). The bottle was sealed and placed in an oil bath at 70° C. and reacted for 8 hours with magnetic stirring. Analysis using FT-IR indicated no —NCO remained. The resulting solution was 18.2% by wt solids, with a small amount of precipitation. The resulting solution was ~16% wt solids.

Example 8

Preparation of Reactant 3/MeFBSE-MDI; 1/12

The procedure described for Example 7 was essentially followed with the exception that 7.32 g (0.0012 mole) of MeFBSE-MDI was used, 45.60 g of EtOAc was used and the resulting solution was ~14.87% by wt. solids.

Example 9

Preparation of Reactant 3/MeFBSE-MDI; 1/8

The procedure described for Example 7 was essentially followed with the exception that 4.88 g (0.008 mole) of MeFBSE-MDI was used, 38.79 g of EtOAc was used and the resulting solution was ~14.87% solids.

Comparative Example C-1

Preparation of MeFBSE-MDI-HEA/"KF2001"; 90/10 wt/wt

A 4 oz. bottle with a magnetic stirring bar was charged with MeFBSE-MDI-HEA (4.50 g; 0.006 mole), "KF-2001" (0.49 g), EtOAc (28.4 g) and "VAZO-67" (0.056 g). Nitrogen was bubbled through the solution for two minutes, and the bottle was sealed and placed in an oil bath at 70° C. for 24 hours. The resulting solution was 13.16% by wt. solids, with a small amount of precipitation. Addition of dimethylformamide (5.0 g) turned the solution clear.

Comparative Example C-2

Preparation of MeFBSE-MDI-HEA/"KF2001"; 80/20 wt/wt

A 4 oz. bottle with a magnetic stirring bar was charged with MeFBSE-MDI-HEA (3.98 g; 0.006 mole), "KF-2001" (1.01 g), EtOAc (27.6 g) and "VAZO-67" (0.050 g). Nitrogen was bubbled through the solution for two minutes, and the bottle was sealed and placed in an oil bath at 70° C. for 24 hours. The resulting solution was 13.37% by wt. solids, with a small amount of precipitation. Addition of dimethylformamide (5.0 g) turned the solution clear.

Comparative Example C-3

Preparation of MeFBSE-MDI-HEA/"KF2001"; 70/30 wt/wt

A 4 oz. bottle with a magnetic stirring bar was charged with MeFBSE-MDI-HEA (3.51 g; 0.005 mole), "KF-2001" (1.01 g), EtOAc (26.75 g) and "VAZO-67" (0.053 g). Nitrogen was bubbled through the solution for two minutes, and the bottle was sealed and placed in an oil bath at 70° C. for 24 hours. The resulting solution was 13.78% by wt. solids, with a small amount of precipitation. Addition of dimethylformamide (5.0 g) turned the solution clear.

Example 10

Preparation of HEA/SM/MeFBSE-MDI; 10/1/8.7

A 4 oz. bottle with a magnetic stirring bar was charged with HEA (1.16 g; 0.010 mole), SM (10.00 g), MIBK (40.0 g), HSCH$_2$CH$_2$SH (0.078 g) and "VAZO-67" (0.01 g). Nitrogen was bubbled through the solution for two minutes, and the bottle was sealed and placed in an oil bath at 70° C. for 24 hours. The resulting solution was milky. To this solution was added MeFBSE-MDI (5.3 g; 0.0087 mole) and DBTDL (3 drops). The solution was held at 70° C. for 4 hours. FT-IR Analysis indicated no —NCO remained.

Example 11

Preparation of HEA/SM/MeFBSE-MDI; 15/1/10.36

A 4 oz. bottle with a magnetic stirring bar was charged with HEA (1.74 g; 0.015 mole), SM (10.00 g), MIBK (40.0 g), HSCH$_2$CH$_2$SH (0.156 g) and "VAZO-67" (0.01 g). Nitrogen was bubbled through the solution for two minutes, and the bottle was sealed and placed in an oil bath at 70° C. for 24 hours. The resulting solution was milky. To this solution was added MeFBSE-MDI (6.3 g; 0.0104 mole) and DBTDL (3 drops). The solution was held at 70° C. for 4 hours. FT-IR Analysis indicated no —NCO remained.

Example 12

Preparation of HEA/SM/MeFBSE-MDI; 20/1/14.80

A 4 oz. bottle with a magnetic stirring bar was charged with HEA (2.32 g; 0.020 mole), SM (10.00 g), MIBK (40.0 g), HSCH$_2$CH$_2$SH (0.312 g) and "VAZO-67" (0.01 g). Nitrogen was bubbled through the solution for two minutes, and the bottle was sealed and placed in an oil bath at 70° C. for 24 hours. The resulting solution was milky. To this solution was added MeFBSE-MDI (9.0 g; 0.0148 mole) and DBTDL (3 drops). The solution was held at 70° C. for 4 hours. FT-IR Analysis indicated no —NCO remained.

Comparative Example C-4

Preparation of MeFBSE-MDI-HEA/SM; 90/10; wt/wt

A 4 oz. bottle with a magnetic stirring bar was charged with MeFBSE-MDI-HEA (2.25 g; 0.031 mole), SM (0.25 g), EtOAc (14.43 g) and "VAZO-67" (0.025 g). Nitrogen was bubbled through the solution for two minutes, and the bottle was sealed and placed in an oil bath at 70° C. for 24 hours. The resulting solution was slightly cloudy. Addition of dimethylformamide (5.0 g) turned the solution clear, yielding a 11.93% wt solids solution. TGA Analysis indicated $T_m$=156° C., $T_c$=81° C. and $T_g$=50° C.

Comparative Example C-5

Preparation of MeFBSE-MDI-HEA/SM; 80/20; wt/wt

A 4 oz. bottle with a magnetic stirring bar was charged with MeFBSE-MDI-HEA (2.00 g; 0.028 mole), SM (0.50 g), EtOAc (14.44 g) and "VAZO-67" (0.026 g). Nitrogen was bubbled through the solution for two minutes, and the bottle was sealed and placed in an oil bath at 70° C. for 24 hours. The resulting solution was slightly cloudy. Addition of dimethylformamide (5.0 g) turned the solution clear, yielding a 11.94% wt solids solution. TGA Analysis indicated $T_m$=153° C., $T_c$=79° C. and $T_g$=50° C.

Comparative Example C-6

Preparation of MeFBSE-MDI-HEA/SM; 60/40; wt/wt

A 4 oz. bottle with a magnetic stirring bar was charged with MeFBSE-MDI-HEA (1.51 g; 0.021 mole), SM (1.01 g), EtOAc (14.45 g) and "VAZO-67" (0.026 g). Nitrogen was bubbled through the solution for two minutes, and the bottle was sealed and placed in an oil bath at 70° C. for 24 hours. The resulting solution was slightly cloudy. Addition of dimethylformamide (5.0 g) turned the solution clear, yielding a 11.95% wt solids solution. TGA Analysis indicated $T_m$=154° C. and $T_c$=92.5° C.

Example 13

Preparation of MeFBSE-MDI/PMPMS; 1/1

A 4 oz. bottle with a magnetic stirring bar was charged with MeFBSE-MDI (12.16 g; 0.020 mole), PMPMS (2.68 g; 0.020 mole), EtOAc (60.0 g) and DBTDL (3 drops). Nitrogen was bubbled through the solution for two minutes, and the bottle was sealed and placed in an oil bath at 70° C. for 8 hours. The resulting solution was slightly cloudy. FT-IR Analysis indicated no —NCO remained.

Example 14

Preparation of MeFBSE-MDI/PMPMS; 0.75/1

A 4 oz. bottle with a magnetic stirring bar was charged with MeFBSE-MDI (9.12 g; 0.015 mole), PMPMS (2.68 g; 0.020 mole), EtOAc (47.0 g) and DBTDL (3 drops). The bottle was sealed and placed in an oil bath at 70° C. and reacted for 8 hours with magnetic stirring. The resulting solution was slightly cloudy. Addition of dimethylformamide (5.0 g) turned the solution clear. FT-IR Analysis indicated no —NCO remained.

Example 15

Preparation of MeFBSE-MDI/PEHA; 4/1 Equivalents

A 4 oz. bottle with a magnetic stirring bar was charged with MeFBSE-MDI (5.0 g; 0.008 mole), PEHA (1.16 g; 0.005 mole) and toluene (40.0 g). The bottle was sealed and placed in an oil bath at 70° C. and reacted for 8 hours with magnetic stirring. The resulting solution was slightly cloudy. FT-IR Analysis indicated no —NCO remained.

TABLE 1

Examples 1-15 and Comparative Examples C-1-C-6
Advancing and Receding water and oil contact angles.

| Example | Advancing/Receding Contact Angle (°) | |
|---|---|---|
| | Water | Oil |
| 1 | 112/98 | 53/39 |
| 2 | 109/91 | 40/32 |
| 3 | 115/98 | 41/31 |
| 4 | 116/91 | 58/38 |
| 5 | 117/92 | 56/37 |
| 6 | 114/95 | 49/36 |
| 7 | 144/96 | 59/20 |
| 8 | 110/93 | 40/33 |
| 9 | 111/91 | 41/30 |
| 10 | 122/99 | 46/30 |
| 11 | 110/100 | 44/27 |
| 12 | 108/98 | 46/31 |
| 13 | 136/83 | 85/67 |
| 14 | 126/81 | 83/67 |
| 15 | 154/105 | 93/19 |
| C-1 | 123/99 | 71/52 |
| C-2 | 116/95 | 70/49 |
| C-3 | 116/93 | 68/43 |
| C-4 | 116/97 | 66/46 |
| C-5 | 118/99 | 71/54 |
| C-6 | 122/107 | 80/62 |

Example 16

Preparation of MeFBSE-MDI/PVA-50

A three-necked, 250 mL round bottom flask equipped with a magnetic stirrer, heating mantle, reflux condenser and nitrogen inlet was charged with PVA-50 (2.0 g), NMP (30.3 g), and heptane (26.0 g). The ensuing mixture was heated at 131° C. To this clear solution was added MeFBSE-MDI (13.25 g) and NMP (30.4 g) and the resulting solution was heated at 135° C. for 4 hours, yielding a dark brown solution (20% solids).

Example 17

Preparation of MeFBSE-MDI/PVA-98

A three-necked, 250 mL round bottom flask equipped with a magnetic stirrer, heating mantle, reflux condenser and nitrogen inlet was charged with PVA-98 (1.0 g), NMP (30.3 g), and heptane (26.0 g). The ensuing mixture was heated at 131° C. To this clear solution was added MeFBSE-MDI (10.68 g) and NMP (16.4 g) and the resulting solution was heated at 120° C. for 4 hours, yielding a dark brown solution (20% solids).

Example 18

Preparation of MeFBSE-MDI/PVA-98/ODI

A three-necked, 250 mL round bottom flask equipped with a magnetic stirrer, heating mantle, reflux condenser and nitrogen inlet was charged with PVA-98 (1.0 g), NMP (30.3 g), and heptane (26.0 g). The ensuing mixture was heated at 137° C. To this clear solution was added ODI (2.6 g), MeFBSE-MDI (5.5 g) and NMP (16.4 g) and the resulting solution was heated at 135° C. for 6 hours, yielding an amber colored solution (20% solids).

Example 19

Preparation of MeFBSE-MDI/PVA-98/GA

A three-necked, 250 mL round bottom flask equipped with a magnetic stirrer, heating mantle, reflux condenser and nitrogen inlet was charged with PVA-98 (1.0 g), NMP (30.3 g), and heptane (21.0 g). The ensuing mixture was heated at 131° C. To this clear solution was added MeFBSE-MDI (8.61 g) and the resulting solution was heated at 130° C. for 4 hours. To this solution were added GA (0.623 g) and NMP (8.75 g) and the resulting solution was heated at 130° C. for 5 hours, yielding a dark brown solution (21% solids).

Comparative Example C7

A three-necked, 250 ml round bottom flask equipped with a magnetic stirrer, heating mantle, reflux condenser and nitrogen inlet was charged with PVA-50 (2.97 g) and xylene (12.3 g). The solution was heated to 80 C. To the resulting clear solution was added 5.2 g ODI. The temperature was raised to 137° C. and the reaction was carried out for another 4 hr. Analysis using FT-IR indicated no —NCO remained. The resulting solution was 40% solids.

Release Coatings; Preparation and Test Method.

The copolymers of the invention were diluted to 5% solids with toluene. The solution was then coated with a #6 wire wound (Mayer) rod onto a 1.6 mil primed polyester terephthalate film. The coated film was attached to a fiberboard frame and dried for 15 minutes at 65° C.

The test method used to evaluate the release coatings was a modification of the industry standard peel adhesion test used to evaluate pressure sensitive adhesive coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75)

2.54 cm by 15.24 cm strips of SCOTCH PERFORMANCE MASKING TAPE 233+ (available from 3M Company, St. Paul, Minn.) were rolled down onto the coated polyester film with a 2.04 kg rubber roller. The laminated samples were then aged for 1 week at 22° C. and 50% relative humidity or for 16 hours at 65° C. Prior to testing, the heat-aged samples were equilibrated to 22° C. and 50% relative humidity for 24 hours.

Release testing was conducted by mounting the masking tape/coated film laminate to the stage of an Instrumentors, Inc. slip/peel tester (model 3M90) with double coated tape. The force required to remove the masking tape at 180 degrees and 228.6 cm/minute was then measured. Tape re-adhesions were also measured by adhering the freshly peeled masking tape to a clean glass plate and measuring the peel adhesion in normal fashion using the same Instrumentors slip/peel tester indicated above, again peeling at 228.6 cm/min and at a 180 degree peel angle. The results of these peel tests are shown in Table 2. The backside of a strip of SCOTCH PERFORMANCE MASKING TAPE 233+ served as a control sample.

Some copolymers of the invention were coated and tested according to the methods described above with the exception that SCOTCH MAGIC TAPE 810 (Available from 3M Company) was used in place of SCOTCH PERFORMANCE MASKING TAPE 233+. The backside of a strip of SCOTCH MAGIC TAPE 810 served as a control sample. The results are shown in Table 2 below.

TABLE 2

Examples 16-19 and Comparative Example C-7. Peel Force and Readhesion.

| | | Peel Force | | Readhesion | |
|---|---|---|---|---|---|
| Example | Tape | 7-day g/cm (oz/in) | 16 hr @ 65° C. g/cm (oz/in) | 7-day g/cm (oz/in) | 16 hr @ 65° C. g/cm (oz/in) |
| 16 | Scotch Magic Tape 810 | 156 (14) | 257 (23) | 312 (28) | 268 (24) |
| 17 | Scotch Magic Tape 810 | 145 (13) | 223 (20) | 323 (29) | 312 (28) |
| C-7 | Scotch Magic Tape 810 | 123 (11) | 234 (21) | 179 (16) | 167 (15) |
| 18 | Masking Tape 233+ | 279 (25) | 346 (31) | 446 (40) | 458 (41) |
| 19 | Masking Tape 233+ | 268 (24) | 335 (30) | 446 (40) | 441 (39.5) |
| C-7 | Masking Tape 233+ | 246 (22) | 335 (30) | 391 (35) | 312 (28) |

Example 20

Preparation of MeFBSE-MDI/Boltron H50

A 125 ml bottle was charged with MeFBSE-MDI (6.0 g, Boltron H50 (1.50 g; previously dried under vacuum), one drop DBTDL, and THF (20 mL; anhydrous tetrahydrofuran). The bottle was heated at 40-60° C. for 1 hr, cooled, and found to contain no isocyanate by FT-IR. Another 0.5 g MeFBSE-MDI was added, the mixture was heated briefly and left overnight.

Examples 21 & 22

MeFBSE-MDI/PVA-17K

PVA-17K (1.80 g) was added to 60 mL NMP at 118° C. and stirred until dissolved, then vacuum was applied, removing approximately 10 mL of NMP. The resulting residue (50.8 g) was divided into two equal portions in dry 125 mL bottles and treated with the amounts of MeFBSE-MDI indicated in the chart for Example 21 and Example 22, 1 drop DBTDL, and heated as Example 20. The products were treated with 80 mL water, collected by filtration and dissolved in THF for testing.

Example 23

MeFBSE-MDI/IOA/HEA/"ELVACITE 1010"

A quart pressure bottle was charged with IOA (123.5 g), HEA (84.5 g), "ELVACITE 1010" (8.7 g; polymethylmethacylate macromonomer; available from Dupont, Wilmington, Del.), 0.43 g "VAZO 67" (0.43 g), EtOAc (277 g), and isopropanol (10 g), purged with nitrogen for 2 minutes and kept 24 hr at 60° C. in a rotating water bath. The procedure described in Example 20 was essentially followed with the exception that 2.5 g of the resulting 40% solution was evaporated to dryness and then redissolved in 10 mL NMP with 3.0 g MeFBSE-MDI.

Example 24

Reaction of MeFBSE-MDI with $NH_2(CH_2CH_2NH)_5H$

A 4 oz bottle was charged with $NH_2(CH_2CH_2NH)_5H$ (1.16 g; 5 mmole), MeFBSE-MDI (5.0 g; 8.24 mmole) and toluene (40 g) and heated at 70° C. for 5 hrs. FT-IR Analysis indicated no —NCO remained.

Example 25

MeFBSE/TPEG 730

The procedure described for Example 20 was essentially followed with the exception that TPEG 730 (2.43 g) was substituted for Boltron H50 and 6.35 g of MeFBSE-MDI was used.

Example 26

MeFBSE-MDI/SD 890

The procedure described for Example 20 was essentially followed with the exception that SD 890 (0.90 g) was substituted for Boltron H50 and 1.22 g of MeFBSE-MDI was used.

Example 27

MeFBSE-MDI/MA/HEA

A 125 mL bottle was charged with MA (7.0 g methyl acrylate), HEA (3.0 g), tert-dodecylmercaptan (0.10 g), "VAZO 67" (30 mg), isopropanol (15 g), and EtOAc (15 g), purged for 40 sec with nitrogen, and kept in a rotating water bath at 60 C for 24 hours. 5.0 g of the resulting polymer solution was evaporated to dryness and then dissolved in 20 mL dry THF and treated with 4.3 g MeFBSE-MDI and 1 drop DBTDL and heated at 55° C. for 20 hr.

Example 28

MeFBSE-MDI/ODA/HEA

A 125 mL bottle was charged with ODA (7.6 g), HEA (2.6 g), tert-dodecylmercaptan (0.10 g), "VAZO 67" (30 mg), isopropanol (15 g), and EtOAc (15 g), purged for 40 sec with nitrogen, and kept in a rotating water bath at 60° C. for 24 hours. 5.0 g of the resulting polymer solution was evaporated to dryness and then dissolved in 20 mL dry THF and treated with 2.2 g MeFBSE-MDI and 1 drop DBTDL and heated at 55 C for 20 hr.

Example 29

MeFBSE-MDI/Polyglycidol

A solution of 5.0 g glycidol (available from Aldrich) in 100 mL $CH_2Cl_2$ was treated with 35 mg $(CF_3SO_2)_2CH_2$ (35 mg in about 2 mL $CH_2Cl_2$; available from 3M, St Paul). The mixture was allowed to stand overnight at room temperature, forming an oily precipitate. The solvent was stripped using a rotary evaporator, leaving a sticky resin (4.7 g). NMR (nuclear magnetic resonance) spectroscopy indicated a mixture of primary (linear polymer) and secondary (branched polymer) alcohols. 4.25 g of the resin was dissolved in THF (27.8 g; slight solubility) and NMP (20 g). 5.0 g of this was reacted with 3.3 g MeFBSE-MDI as in Example 20.

TABLE 3

Examples 20-29; Amounts of Materials used and Resulting Advancing and Receding Contact Angles (°)

| Example | MeFBSE-MDI (g) | Reactant (g) | Advancing/Receding Contact Angles (°) | |
|---|---|---|---|---|
| | | | Water | Oil |
| 20 | 6.5 | 1.5 g Boltron H50 20 ml THF | 126/95 | 80/63 |
| 21 | 11.4 | 0.90 g PVA-17K 24 g NMP | 145/99 | 85/59 |
| 22 | 8.4 | 0.90 g PVA-17K 24 g NMP | 123/83 | 73/62 |
| 23 | 3.0 | 2.5 g IOA/HEA/Elvacite 1010 | 131/82 | 82/52 |
| 24 | 5.0 g | 1.16 g $H_2N(C_2H_4NH)_5H$ | 154/105 | 93/19 |
| 25 | 6.35 | 2.43 g TPEG 730 20 ml THF | 123/74 | 79/68 |
| 26 | 1.22 | 0.90 g SD 890 | 128/86 | 79/57 |
| 27 | 4.3 | 5.0 g MA/HEA | 128/88 | 83/59 |
| 28 | 2.0 | 5.0 g ODA/HEA | 131/81 | 82/59 |
| 29 | 3.3 | 0.40 g polyglycidol | 130/86 | 83/42 |

Example 30-33

Preparation of BUTVAR B-79/MeFBSE-MDI

For example 30, a 100 ml flask was charged with BUTVAR B-79 (4.35 g) and MEK (35.09 g). MEK was partially distilled from the mixture, leaving 26.39 g MEK in the reaction. Next, MeFBSE-MDI (5.16 g; 0.0085 mole) was charged into the reaction, which was placed in a 65° C. oil bath. After 5 minutes, a Fourier Transform Infrared Spectroscopy (FTIR) spectrum was taken of the reaction showing a strong isocyanate peak at 2263 cm$^{-1}$. Dibutyltin dilaurate (~20 mg) was added to the reaction, and after 45 minutes another FTIR spectrum was taken showing an absence of isocyanate at 2263 cm$^{-1}$.

Examples 31-33 were prepared essentially as described for Example 30, except substituting the amounts of reagents listed in Table 4.

Examples 34-35

Preparation of BUTVAR B-98/MeFBSE-MDI

Examples 34-35 were prepared essentially as described for Example 30, except substituting BUTVAR B-98 for BUTVAR B-79 and using the amounts of reagents listed in Table 4.

TABLE 4

Examples 30-35; Amounts of Materials Used and Resulting Advancing and Receding Contact Angles (°)

| Example | BUTVAR B-79 (g) | BUTVAR B-98 (g) | MeFBSE-MDI (g) | MEK (g) | Advancing/Receding Contact Angles (°) Water | Oil |
|---|---|---|---|---|---|---|
| 30 | 4.35 | | 5.16 | 26.39 | 130/94 | 85/57 |
| 31 | 4.35 | | 5.76 | 24.65 | 134/84 | 86/51 |
| 32 | 4.35 | | 6.37 | 24.65 | 129/91 | 86/57 |
| 33 | 4.35 | | 6.98 | 24.65 | 130/84 | 81/51 |
| 34 | | 2.22 | 5.16 | 12.58 | 119/82 | 75/52 |
| 35 | | 2.22 | 5.77 | 22.58 | 119/80 | 72/49 |

The referenced descriptions contained in the patents, patent documents, and publications cited herein are incorporated by reference in their entirety as if each were individually incorporated.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A fluorochemical compound comprising the reaction product of:
    (a) the reaction product of:
        (i) at least one fluorochemical alcohol represented by the formula:

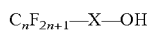

$C_nF_{2n+1}$—X—OH wherein:
n=1 to 6,

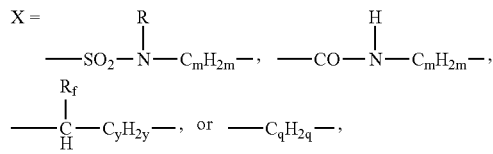

R=hydrogen or an alkyl group of 1 to 4 carbon atoms,
m=2 to 8,
$R_f$=$C_nF_{2n+1}$,
y=0 to 6, and
q=1 to 8; and
    (ii) at least one unbranched symmetric diisocyanate, and
(b) at least one co-reactant comprising two or more functional groups that are capable of reacting with an isocyanate group, wherein at least one co-reactant comprises a polyol selected from an acrylate polymer or copolymer comprising hydroxyl-containing (meth) acrylate monomers, a polyester diol, a dimer diol, a fatty acid ester diol, a polysiloxane dicarbinol, an alkane diol, an alkane tetraol, a polyvinyl alcohol, a polyepoxide, a polystyrene, a polyester, or a polyurethane; a polyamine selected from $H_2N(CH_2CH_2NH)_2H$, $H_2N(CH_2CH_2NH)_3H$, $H_2N(CH_2CH_2NH)_4H$, $H_2N(CH_2CH2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2CH_2NH)_2H$, $H_2N(CH_2)_3HCH_2CH$=$CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2$, $C_6H_5NH(CH_2)_2NH(CH_2)_2NH_2$, 1,10-diaminodecane, 1,12-diaminododecane, 9,9-bis(3-aminopropyl)fluorene, bis(3-aminopropyl)phenylphosphine, 2-(4-aminophenyl)ethylamine, 1,4-butanediol bis(3-aminopropyl)ether, $N(CH_2CH_2NH_2)_3$, 1,8-diamino-p-menthane, 4,4'-diaminodicyclohexylmethane 1,3-bis(3-aminopropyl)tetramethyldisiloxane, 1,8-diamino-3,6-dioxaoctane, 1,3-bis(aminomethyl) cyclohexane, 1,4-bis(3-aminopropyl)piperazine, a homopolymer or copolymer of ethyleneimine, aminopropylmethylsiloxane-co-dimethylsiloxane, or bis-aminopropyldimethylsiloxane; a polythiol; or a polyvinyl butyral.

2. The fluorochemical compound of claim 1 wherein n=1 to 5.

3. The fluorochemical compound of claim 2 wherein n=4.

4. The fluorochemical compound of claim 1 wherein X is

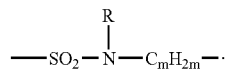

5. The fluorochemical compound of claim 1 wherein the fluorochemical alcohol is $C_4F_9SO_2NCH_3(CH_2)_2OH$.

6. The fluorochemical compound of claim 1 wherein the unbranched symmetric diisocyanate is 4,4'-diphenylmethane diisocyanate.

7. The fluorochemical compound of claim 1 wherein at least one co-reactant is a polythiol.

8. A coating composition comprising a solvent and the fluorochemical compound of claim 1.

9. The coating composition of claim 8 wherein the coating composition is a release coating.

10. A method for making a fluorochemical compound comprising:

(a) reacting at least one fluorochemical alcohol with at least one unbranched symmetric diisocyanate to form a fluorinated isocyanate, the fluorochemical alcohol being represented by the formula:

$$C_nF_{2n+1}-X-OH$$

wherein:

n=1 to 6,

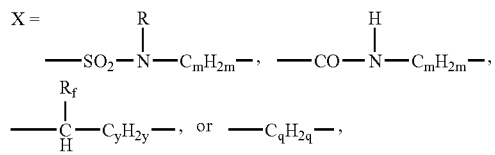

R=hydrogen or an alkyl group of 1 to 4 carbon atoms, m=2 to 8, $R_f=C_nF_{2n+1}$, y=0 to 6, and q=1 to 8; and (b) reacting the fluorinated isocyanate with at least one compound comprising two or more functional groups that are capable of reacting with an isocyanate group, wherein at least one compound comprises a polyol selected from an acrylate polymer or copolymer comprising hydroxyl-containing (meth)acrylate monomers, a polyester diol, a dimer diol, a fatty acid ester diol, a polysiloxane dicarbinol, an alkane diol, an alkane tetraol, a polyvinyl alcohol, a polyepoxide, a polystyrene, a polyester, or a polyurethane; a polyamine selected from $H_2N(CH_2CH_2)_2H$, $H_2N(CH_2CH_2NH)_3H$, $H_2H$ $(CH_2CH_2NH)_4H$, $H_2N(CH_2CH_2NH)_5H$, $H_2N$ $(CH_2CH_2CH_2NH)_2H$, $H_2N(CH_2CH_2CH_2NH)_3H$, $H_2N$ $(CH_2CH_2CH_2CH_2NH)_2H$, $H_2N$ $(CH_2CH_2CH_2CH_2CH_2CH_2NH)_2H$, $H_2N(CH_2)_3$ $NHCH_2CH=CHCH_2NH(CH_2)_3NH_2$, $H_2N(CH_2)_4NH$ $(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH$ $(CH_2)_3NH$ $(CH_2)_2NH_2$, $H_2N(CH_2)_3NH(CH_2)_2NH_2$, $C_6H_5NH(CH_2)_2NH(CH_2)_2NH_2$, 1,10-diaminodecane, 1.12-diaminododecane. 9,9-bis(3-aminopropyl)fluorene, bis(3 -aminopropyl)phenylphosphine, 2-(4-aminophenyl)ethylamine, 1,4-butanediol bis(3-aminopropyl) ether, $N(CH_2CH_2NH_2)_3$, 1,8-diamino-p-menthane. 4,4'-diaminodicyclohexylmethane, 1,3-bis(3-aminopropyl)tetramethyldisiloxane, 1,8-diamino-3,6-dioxaoctane 1,3-bis(aminomethyl)cyclohexane, 1,4-bis(3-aminopropyl)piperazine, a homopolymer or copolymer of ethyleneimine, aminopropylmethylsiloxane-co-dimethylsiloxane, or bis-aminopropyldimethylsiloxane; a polythiol; or a polyvinyl butyral.

11. The fluorochemical compound of claim 1 wherein at least one co-reactant comprises an acrylate polymer or copolymer comprising hydroxyl-containing (meth)acrylate monomers; a polyester diol; a dimer diol; a fatty acid ester diol; a polysiloxane dicarbinols; an alkane diol; an alkane tetraols; a polyvinyl alcohol; a polyepoxides; a polystyrene; a polyester; or a polyurethane.

12. The fluorochemical compound of claim 11 wherein at least one co-reactant comprises an acrylate polymer or copolymer comprising hydroxyl-containing (meth)acrylate monomers.

13. The fluorochemical compound of claim 12 wherein at least one co-reactant comprises an acrylate copolymer comprising hydroxyethyl acrylate in combination with butyl acrylate, isooctyl acrylate, or octadecyl acrylate; poly co{hydroxyethyl acrylate/mercaptopropylmethylsiloxane-co-dimethylsiloxane}; or poly(2-hydroxyethyl methacrylate).

14. The fluorochemical compound of claim 1 wherein at least one co-reactant comprises $H_2N(CH_2CH_2NH)_2H$; $H_2N(CH_2CH_2NH)_3H$; $H_2N(CH_2CH_2NH)_4H$; $H_2N(CH_2CH_2NH)_5$ $H$; $H_2N(CH_2CH_2CH_2NH)_2H$; $H_2N$ $(CH_2CH_2CH_2NH)_3H$; $H_2N(CH_2CH_2CH_2CH_2NH)_2H$; $H_2N$ $(CH_2CH_2CH_2CH_2CH_2CH_2NH)$ $_2H$; $H_2N(CH_2)_3$ $NHCH_2CH=CHCH_2NH(CH_2)_3NH_2$; $H_2N(CH_2)_4NH$ $(CH_2)_3$ $NH_2$; $H_2N(CH_2)_3NH(CH_2)_4NH(CH_2)_3NH_2$; $H_2N$ $(CH_2)_3NH(CH_2)_2NH$ $(CH_2)_3NH_2$; $H_2N(CH_2)_2NH(CH_2)_3$ $NH(CH_2)_2NH_2$; $H_2N(CH_2)_3NH(CH_2)_2NH$ $_2$; $C_6H_5NH$ $(CH_2)_2NH(CH_2)_2NH_2$; 1,10-diaminodecane; 1,12-diaminododecane; 9,9-bis(3-aminopropyl)fluorene; bis(3-aminopropyl)phenylphosphine; 2-(4-aminophenyl)ethylamine; 1,4-butanediol bis(3-aminopropyl)ether; $N(CH_2CH_2NH_2)_3$; 1,8-diamino-p-menthane; 4,4'-diaminodicyclohexylmethane; 1,3-bis(3-aminopropyl) tetramethyldisiloxane; 1,8-diamino-3,6-dioxaoctane; 1,3-bis(aminomethyl)cyclohexane; 1,4-bis(3-aminopropyl)piperazine; a homopolymer or copolymer of ethyleneimine; aminopropylmethylsiloxane-co-dimethylsiloxane; or bis-aminopropyldimethylsiloxane.

15. The fluorochemical compound of claim 7 wherein at least one co-reactant comprises a homopolymer of mercaptopropylmethylsiloxane; a copolymer of mercaptopropylmethylsiloxane and dimethylsiloxane; 1,1,1-trimethylolpropane tris-(3-mercaptopropionate); pentaerythritol tetra(3-mercaptopropionate); trimethylolpropane tris(3-mercaptopropionate); tris[2-(3-mercaptopropionyloxy) ethyl]isocyanurate; 2,2'-oxydiethanethiol; 1,2-ethanethiol; 3,7-dithia-1,9-nonanedithiol; 1,4-butanedithiol; 1,6-hexanedithiol; 1,7-heptanedithiol; 1,8-octanedithiol; 1,9-nonanedithiol; 3,6-dioxa-1,8-octanedithiol; 1,10-decanedithiol; 1,12-dimercaptododecane; ethylene glycol bis (3-mercaptopropionate); or 1,4-butanediol bis(3-mercaptopropionate).

16. The method of claim 10 wherein the fluorochemical compound comprises unreacted functional groups thereon.

17. The method of claim 10 wherein at least one compound comprises an acrylate polymer or copolymer comprising hydroxyl-containing (meth)acrylate monomers; a polyester diol; a dimer diol; a fatty acid ester diol; a polysiloxane dicarbinols; an alkane diol; an alkane tetraols; a polyvinyl alcohol; a polyepoxides; a polystyrene; a polyester; or a polyurethane.

18. The method of claim 17 wherein at least one compound comprises an acrylate copolymer comprising hydroxyethyl acrylate in combination with butyl acrylate, isooctyl acrylate, or octadecyl acrylate; poly co{hydroxyethyl acrylate/mercaptopropylmethylsiloxane-co-dimethylsiloxane}; or poly(2-hydroxyethyl methacrylate).

19. The method of claim 10 wherein at least one compound comprises $H_2N(CH_2CH_2NH)_2H$; $H_2N(CH_2CH_2NH)_3$ $H$; $H_2N(CH_2CH_2NH)_4H$; $H_2N(CH_2CH_2NH)_5H$; $H_2N$ $(CH_2CH_2CH_2NH)_2H$; $H_2N(CH_2CH_2CH_2NH)_3H$; $H_2N$ $(CH_2CH_2CH_2CH_2NH)_2H$; $H_2N$ (CH$_2$CH$_2$CH$_2$CH$_2$CH$_2$CH$_2$NH)$_2$H; H$_2$N(CH$_2$)$_3$NHCH$_2$CH=CHCH$_2$NH(CH$_2$)$_3$NH$_2$; H$_2$N(CH$_2$)$_4$NH(CH$_2$)$_3$NH$_2$; H$_2$N(CH$_2$)$_3$NH(CH$_2$)$_4$NH(CH$_2$)$_3$NH$_2$; H$_2$N(CH$_2$)$_3$NH(CH$_2$)$_2$NH(CH$_2$)$_3$NH$_2$; H$_2$N(CH$_2$)$_2$NH(CH$_2$)$_3$NH(CH$_2$)$_2$NH$_2$; H$_2$N(CH$_2$)$_3$NH(CH$_2$)$_2$NH$_2$; C$_6$H$_5$NH(CH$_2$)$_2$NH(CH$_2$)$_2$NH$_2$; 1,10-diaminodecane; 1,12-diaminododecane; 9,9-bis(3-aminopropyl)fluorene; bis(3-aminopropyl)phenylphosphine; 2-(4-aminophenyl)ethylamine; 1,4-butanediol bis(3-aminopropyl)ether; N(CH$_2$CH$_2$NH$_2$)$_3$; 1,8-diamino-p-menthane; 4,4'-diaminodicyclohexylmethane; 1,3-bis(3-aminopropyl) tetramethyldisiloxane; 1,8-diamino-3,6-dioxaoctane; 1,3-bis(aminomethyl) cyclohexane; 1,4-bis(3-aminopropyl)piperazine; a homopolymer or copolymer of ethyleneimine; aminopropylmethylsiloxane-co-dimethylsiloxane; or bis-aminopropyldimethylsiloxane.

20. The method of claim 10 wherein at least one compound comprises a polyvinyl butyral.

21. An article comprising a substrate coated with the coating composition of claim 1.

22. The article of claim 21 wherein the substrate is a hard substrate or a fibrous substrate.

23. The article of claim 22 wherein the substrate is a fibrous substrate.

24. A fluorochemical compound comprising the reaction product of:
(a) the reaction product of:
(i) at least one fluorochemical alcohol represented by the formula:

$C_nF_{2n+1}$—X—OH wherein:
n=1 to 6,

X = 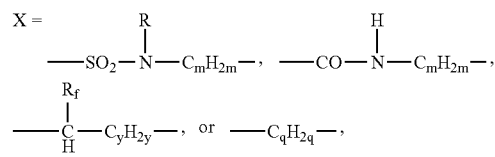

R=hydrogen or an alkyl group of 1 to 4 carbon atoms,
m=2 to 8,
$R_f$=$C_nF_{2n+1}$,
y=0 to 6, and
q=1 to 8; and
(ii) at least one unbranched symmetric diisocyanate, and
(b) at least one co-reactant comprising two or more functional groups that are capable of reacting with an isocyanate group, wherein at least one co-reactant comprises a polyvinyl butyral.

25. The fluorochemical compound of claim 24 wherein the coating composition is a release coating.

26. An article comprising a substrate coated with a coating composition comprising the fluorochemical compound of claim 24.

27. The article of claim 26 wherein the substrate is a hard substrate or a fibrous substrate.

* * * * *

UNITED STATES PATENT AND TRADEMARK OFFICE
CERTIFICATE OF CORRECTION

PATENT NO. : 7,268,197 B2
APPLICATION NO. : 11/275114
DATED : September 11, 2007
INVENTOR(S) : George G. I. Moore It is certified that error appears in the above-identified patent and that said Letters Patent is hereby corrected as shown below:

Column 3,
Line 21, delete "$C_3F_7SO_2NCH_3(CH_2)$  $_3OH$," and insert
-- $C_3F_7SO_2NCH_3(CH_2)_3OH$, --, therefor.

Column 6,
Line 48, delete "$N(CH_2CH_2NH_2)$ 3,1,8-diamino-p-menthane," and insert
-- $N(CH_2CH_2NH_2)_3$,1,8-diamino-p-menthane, --, therefor.

Column 20,
Line 30, in claim 1, delete "$(CH_2CH2NH)_5H$," and insert -- $(CH_2CH_2NH)_5H$, --, therefor.

Line 33, in claim 1, delete "$HCH_2CH=$" and insert -- N$HCH_2CH=$ --, therefor.

Line 34, in claim 1, delete "$(CH_2)$  $_3NH_2$," and insert -- $(CH_2)_3NH_2$, --, therefor.

Line 36, in claim 1, delete "$H_2N(CH_2)_3NH(CH_2)_2$," and insert
-- $H_2N(CH_2)_3NH(CH_2)_2$NH_2, --, therefor.

Column 21,
Line 40, in claim 10, delete "$H_2N(CH_2CH_2)_2H$," and insert -- $H_2N(CH_2CH_2$NH$)_2H$, --, therefor.

Line 40, in claim 10, delete "$H_2$H" and insert -- $H_2N$ --, therefor.

Line 48, in claim 10, delete "$(CH_2)_3NH$  $(CH_2)_2NH_2$," and insert
-- $(CH_2)_3NH(CH_2)_2NH_2$, --, therefor.

Line 50, in claim 10, delete "1.12-diaminododecane." and insert
-- 1,12-diaminododecane, --, therefor.

Line 53, in claim 10, delete "1,8-diamino-p-menthane." and insert
-- 1,8-diamino-p-menthane, --, therefor.

Column 22,
Line 15, in claim 14, delete "$(CH_2CH_2NH)_5$  $H$;" and insert -- $(CH_2CH_2NH)_5H$; --, therefor.

Line 17, in claim 14, delete "$(CH_2CH_2CH_2CH_2CH_2CH_2NH)$  $_2H$;" and insert
-- $CH_2CH_2CH_2CH_2CH_2CH_2NH)_2H$; --, therefor.

UNITED STATES PATENT AND TRADEMARK OFFICE
CERTIFICATE OF CORRECTION

PATENT NO. : 7,268,197 B2
APPLICATION NO. : 11/275114
DATED : September 11, 2007
INVENTOR(S) : George G. I. Moore It is certified that error appears in the above-identified patent and that said Letters Patent is hereby corrected as shown below:

Column 22 (cont'd),
Line 19, in claim 14, delete "$(CH_2)_3$  $NH_2$;" and insert -- $(CH_2)_3NH_2$; --, therefor.

Line 20, in claim 14, delete "$(CH_2)_3NH(CH_2)_2NH$  $(CH_2)_3NH_2$;" and insert -- $(CH_2)_3NH(CH_2)_2NH(CH_2)_3NH_2$; --, therefor.

Line 21, in claim 14, delete "$H_2N(CH_2)_3NH(CH_2)_2NH$  $_2$;" and insert -- $H_2N(CH_2)_3NH(CH_2)_2NH_2$; --, therefor.

Column 23,
Line 2, in claim 19, delete "=$CHCH_2NH(CH_2)$3$NH_2$;" and insert -- =$CHCH_2NH(CH_2)_3NH_2$; --, therefor.

Line 3, in claim 19, delete "$_{H2}N$" and insert -- $H_2N$ --, therefor.

Line 4, in claim 19, delete "$H_2N(CH_2)_2NH(CH_2)$  $_3$" and insert -- $H_2N(CH_2)_2NH(CH_2)_3$ --, therefor.

Line 5, in claim 19, delete "$H(CH_2)_2NH_2$;" and insert -- $NH(CH_2)_2NH_2$; --, therefor.

Signed and Sealed this

Twenty-second Day of July, 2008

JON W. DUDAS
*Director of the United States Patent and Trademark Office*